(12) United States Patent
Sun et al.

(10) Patent No.: US 11,888,136 B2
(45) Date of Patent: Jan. 30, 2024

(54) BATTERY, POWER CONSUMPTION DEVICE, AND METHOD AND DEVICE FOR PRODUCING BATTERY

(71) Applicant: CONTEMPORARY AMPEREX TECHNOLOGY CO., LIMITED, Ningde (CN)

(72) Inventors: Zhanyu Sun, Ningde (CN); Haiqi Yang, Ningde (CN); Xiaoteng Huang, Ningde (CN); Peng Wang, Ningde (CN); Yuepan Hou, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/118,860

(22) Filed: Mar. 8, 2023

(65) Prior Publication Data
US 2023/0268586 A1 Aug. 24, 2023

Related U.S. Application Data

(63) Continuation of application No. PCT/CN2022/077149, filed on Feb. 21, 2022.

(51) Int. Cl.
*H01M 10/6555* (2014.01)
*H01M 10/04* (2006.01)
*H01M 50/209* (2021.01)

(52) U.S. Cl.
CPC ... *H01M 10/6555* (2015.04); *H01M 10/0404* (2013.01); *H01M 50/209* (2021.01)

(58) Field of Classification Search
CPC ......... H01M 10/6555; H01M 10/0404; H01M 50/209
See application file for complete search history.

(56) References Cited

U.S. PATENT DOCUMENTS

2001/0007728 A1 7/2001 Ogata et al.
2022/0077521 A1 3/2022 Jin et al.

FOREIGN PATENT DOCUMENTS

CN 110994068 A 4/2020
CN 213752811 U 7/2021
(Continued)

OTHER PUBLICATIONS

Allaboutricruits, Battery Ratings, Dec. 2, 2021, All About Circuits, https://www.allaboutcircuits.com/textbook/direct-current/chpt-11/battery-ratings/ (Year: 2021).*
(Continued)

*Primary Examiner* — Jimmy Vo
(74) *Attorney, Agent, or Firm* — Scully, Scott, Murphy & Presser, P.C.

(57) ABSTRACT

Provided are a battery, a power consumption device, a method and a device for producing a battery. The battery includes: a plurality of battery cells arranged along a first direction; a thermal management component extending along the first direction and being connected to a first wall of each battery cell among the plurality of battery cells, the first wall being a wall with a largest surface area of the battery cell, and the thermal management component being configured to adjust a temperature of the battery cell; and where in the second direction, a size H1 of the thermal management component and a size H2 of the first wall satisfy: $0.1 \leq H1/H2 \leq 2$, and the second direction is perpendicular to the first direction and parallel to the first wall.

12 Claims, 6 Drawing Sheets

(56) References Cited

FOREIGN PATENT DOCUMENTS

| CN | 213782096 U | 7/2021 | | |
|---|---|---|---|---|
| CN | 113594584 A | 11/2021 | | |
| CN | 215771340 U | 2/2022 | | |
| EP | 1117138 A1 | 7/2001 | | |
| EP | 3648243 A1 * | 5/2020 | .......... | H01M 10/613 |
| EP | 3780254 A1 * | 2/2021 | .......... | H01M 10/613 |
| EP | 3886226 A1 | 9/2021 | | |
| WO | WO-2020253684 A1 * | 12/2020 | .......... | H01M 10/613 |

OTHER PUBLICATIONS

International Search Report dated Nov. 22, 2022 issued in PCT/CN2022/077149.
Written Opinion dated Nov. 22, 2022 issued in PCT/CN2022/077149.
Extended European Search Report dated Aug. 29, 2023 received in European Patent Application No. EP 22720544.0.

\* cited by examiner

BATTERY, POWER CONSUMPTION DEVICE, AND METHOD AND DEVICE FOR PRODUCING BATTERY

CROSS-REFERENCE TO RELATED APPLICATIONS

This application is a continuation of International Application No. PCT/CN2022/077149, filed on Feb. 21, 2022, the disclosure of which is hereby incorporated by reference in its entirety.

TECHNICAL FIELD

The present application relates to the field of battery technologies, and in particular, to a battery, a power consumption device, and a method and a device for producing a battery.

BACKGROUND

With the increasing environmental pollution, new energy industry has attracted more and more attention. In the new energy industry, the battery technology is an important factor related to their development.

Energy density of the battery is an important parameter in the performance of the battery. However, other performance parameters of the battery need to be considered when improving the energy density of the battery. Therefore, how to improve the performance of the battery is one urgent technical problem to be solved in the battery technology.

SUMMARY

The present application provides a battery, a power consumption device, and a method and a device for producing a battery, which may improve the energy density of the battery while meeting the requirements of thermal management in the battery, thereby improving the performance of the battery.

In a first aspect, a battery is provided, the battery includes a plurality of battery cells arranged along a first direction; and a thermal management component extending along the first direction and being connected to a first wall of each battery cell among the plurality of battery cells, the first wall being a wall with a largest surface area of the battery cell, the thermal management component being configured to adjust a temperature of the battery cell; and where in a second direction, a size $H1$ of the thermal management component and a size $H2$ of the first wall satisfy: $0.1 \leq H1/H2 \leq 2$, and the second direction is perpendicular to the first direction and parallel to the first wall.

In an embodiment of the present application, the thermal management component is connected to the first wall with a largest surface area of each battery cell among the plurality of battery cells that arranged in a column along the first direction; and where along the first direction, the size $H1$ of the thermal management component and the size $H2$ of the first wall satisfy $0.1 \leq H1/H2 \leq 2$. In this way, there is no need to provide a beam and other structures in the middle of a box body of the battery, which may largely improve the space utilization rate inside the battery, thereby improving the energy density of the battery; and at the same time, the use of the above thermal management component may further meet the requirements of thermal management in the battery. Therefore, a technical solution of an embodiment of the present application may improve the energy density of the battery while meeting the requirements of thermal management in the battery, thereby improving the performance of the battery.

In a possible implementation manner, the size $H1$ of the heat management component and the size $H2$ of the first wall further satisfy: $0.3 \leq H1/H2 \leq 1.3$. In this way, it can be ensured that the temperature of the battery cell does not exceed $55°$ C. during the charging of the battery, especially in the process of fast charging.

In a possible implementation manner, a heat exchange area between the first wall and the thermal management component is S, and a relationship between a capacity Q of the battery cell and the heat exchange area S satisfies: $0.03\ \text{Ah/cm}^2 \leq Q/S \leq 6.66\ \text{Ah/cm}^2$. In this way, the temperature of the battery cell can be maintained in an appropriate range in the process of fast charging; and in addition, when the capacity Q of the battery cell is certain, the heat exchange area S can be adjusted to flexibly meet the requirements of thermal management of the battery.

In a possible implementation manner, the size $H1$ of the thermal management component is 1.5 cm-30 cm. In this way, it can be ensured that the temperature of the battery cell does not exceed $55°$ C. in the process of fast charging of the battery.

In a possible implementation manner, the thermal management component includes a first thermally conductive plate and a second thermally conductive plate provided opposite to each other along a third direction; where a flow channel is provided between the first thermally conductive plate and the second thermally conductive plate, and the flow channel is configured to accommodate a fluid for adjusting a temperature of the battery cell, and the third direction is perpendicular to the first direction and the second direction.

In a possible implementation manner, the thermal management component further includes a stiffener, the stiffener is provided between the first thermally conductive plate and the second thermally conductive plate, and the stiffener, the first thermally conductive plate and the second thermally conductive plate form the flow channel. In this way, the structural strength of the thermal management component is enhanced.

In a possible implementation manner, an angle between the stiffener and the first thermally conductive plate or the second thermally conductive plate is an acute angle. In this way, in the third direction, the thermal management component can have a larger compression space and can provide an expansion space for the battery cell.

In a possible implementation manner, the battery cell includes two first walls provided opposite to each other in a third direction and two second walls provided opposite to each other in the first direction, where in the first direction, the second walls of two adjacent battery cells face each other, and the third direction is perpendicular to the first direction and the second direction. In this way, the first wall having a large area is connected to the thermal management component, which facilitates the thermal exchange of the battery cells and ensures the performance of the battery.

In a possible implementation manner, the battery includes the plurality of the battery cells arranged in a plurality of columns along the first direction and a plurality of the thermal management components, where the plurality of columns of the battery cells and the plurality of the thermal management components are alternately provided in a third direction, and the third direction is perpendicular to the first direction and the second direction. In this way, the plurality of columns of battery cells and the plurality of thermal management components are connected to each other to form a whole, and are accommodated in the box body, which may not only effectively perform the thermal management on each column of battery cells, but also ensure the overall structural strength of the battery, thereby improving the performance of the battery.

In a possible implementation manner, the thermal management component and the first wall are bonded. In this way, the strength of the connection between the thermal management component and the first wall is increased.

In a second aspect, a power consumption device is provided, including: the battery in the above first aspect or any possible implementation manner of the first aspect, the battery being configured to provide electric energy.

In a third aspect, a method for producing a battery is provided, including: providing a plurality of battery cells arranged along a first direction; providing a thermal management component extending along the first direction and being connected to a first wall of each battery cell among the plurality of battery cells, the first wall being a wall with a largest surface area of the battery cell, the thermal management component being configured to adjust a temperature of the battery cell; and where in a second direction, a size H1 of the thermal management component and a size H2 of the first wall satisfy: $0.1 \leq H1/H2 \leq 2$, and the second direction is perpendicular to the first direction and parallel to the first wall.

In a fourth aspect, a device for producing a battery is provided, including a module for executing the method provided in the above third aspect.

In an embodiment of the present application, the thermal management component is connected to the first wall with a largest surface area of each battery cell among the plurality of battery cells that arranged in a column along the first direction; and where along the first direction, the size H1 of the thermal management component and the size H2 of the first wall satisfy $0.1 \leq H1/H2 \leq 2$. In this way, there is no need to provide a beam and other structures in the middle of a box body of the battery, which may largely improve the space utilization rate inside the battery, thereby improving the energy density of the battery; and at the same time, the use of the above thermal management component may further meet the requirements of thermal management in the battery. Therefore, a technical solution of an embodiment of the present application may improve the energy density of the battery while meeting the requirements of thermal management in the battery, thereby improving the performance of the battery.

BRIEF DESCRIPTION OF DRAWINGS

In order to describe the technical solutions in embodiments of the present application more clearly, the following briefly describes the accompanying drawings required for the embodiments of the present application. It is obvious that the accompanying drawings in the following description show merely some embodiments of the present application, and those of ordinary skill in the art may still derive other drawings from these accompanying drawings without creative efforts.

Figure 1:
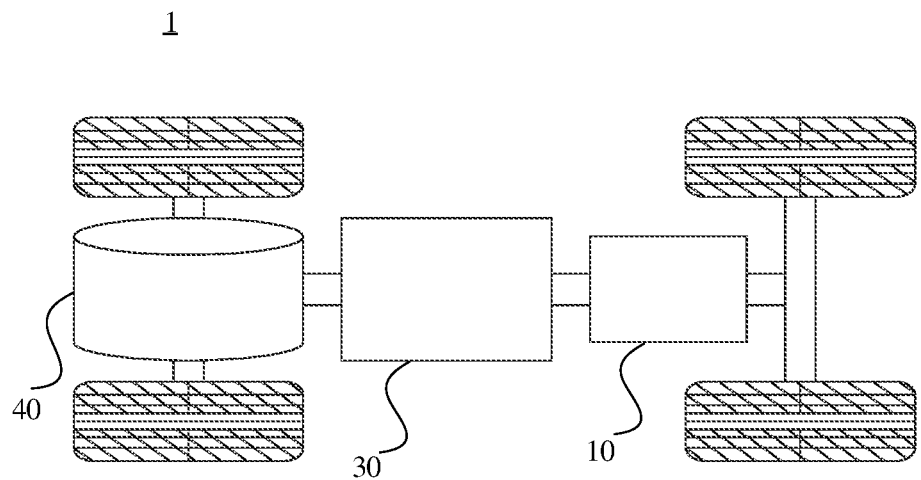
FIG. 1 is a schematic diagram of a vehicle according to an embodiment of the present application.

In the accompany drawings, the accompany drawings are not drawn to actual scale.

DESCRIPTION OF EMBODIMENTS

Implementation manners of the present application will be further described below in detail with reference to the accompanying drawings and embodiments. The detailed description of the following embodiments and the accompanying drawings are used to exemplarily illustrate principles of the present application, but cannot be used to limit the scope of the present invention, that is, the present application is not limited to the described embodiments.

In the depiction of the present application, it is noted that unless otherwise defined, all technological and scientific terms used have the same meanings as those commonly understood by those skilled in the art to which the present application belongs. The terms used are merely for the purpose of describing specific embodiments, but are not intended to limit the present application. The terms "including" and "having" and any variations thereof in the specification and the claims of the present application as well as the brief description of the drawings described above are intended to cover non-exclusive inclusion. "A plurality of" means more than two; and orientations or positional relationships indicated by terms such as "up", "down", "left", "right", "inside", and "outside" are merely for convenience of describing the present application and for simplifying the description, rather than for indicating or implying that an apparatus or element indicated must have a specific orientation, and must be constructed and operated in a specific orientation, which thus may not be understood as a limitation the present application. In addition, the terms "first", "second", and "third" are only intended for the purpose of description, and shall not be understood as an indication or implication of relative importance. "Vertical" is not strictly vertical, but within an allowable range of error. "Parallel" is not strictly parallel, but within an allowable range of error.

The phrase "embodiments" referred to in the present application means that the descriptions of specific features, structures, and characteristics in combination with the embodiments are included in at least an embodiment of the present application. The phrase at various locations in the specification does not necessarily refer to the same embodiment, or an independent or alternative embodiment exclusive of another embodiment. Those skilled in the art understand, in explicit and implicit manners, that the embodiments described in the present application may be combined with other embodiments.

The terms representing directions in the following description are all directions shown in the drawings, and do not limit the specific structure of the present application. In the description of the present application, it should be further noted that unless otherwise explicitly specified and defined, the terms "mounting", "connecting" and "connection" should be understood in a broad sense; for example, they may be a fixed connection, a detachable connection, or an integrated connection; may be a direct connection and may also be an indirect connection through an intermediate medium, or may be communication between the interiors of two elements. Those of ordinary skill in the art may appreciate the specific meanings of the foregoing terms in the present application according to specific circumstances.

In the present application, the term "and/or" is only an association relation describing associated objects, which means that there may be three relations. For example, A and/or B may represent three situations: A exists alone, both A and B exist, and B exists alone. In addition, the character "/" in the present application generally indicates that the associated objects before and after the character are in an "or" relation.

In the present application, battery cells may include lithium-ion secondary batteries, lithium-ion primary batteries, lithium-sulfur batteries, sodium/lithium-ion batteries, sodium-ion batteries or magnesium-ion batteries, etc., which are not limited by the embodiments of the present application. The battery cells may be cylindrical, flat, cuboid or in another shape, which is not limited by the embodiments of the present application. The battery cells are generally divided into three types according to the way of packaging: cylindrical battery cells, square battery cells and pouch battery cells, which are not limited by the embodiments of the present application either.

The battery mentioned in the embodiment of the present application refers to a single physical module that includes one or more battery cells to provide a higher voltage and capacity. For example, the battery mentioned in the present application may include a battery pack, etc. The battery generally includes a box body for enclosing one or more battery cells. The box body may prevent liquid or other foreign matters from affecting the charging or discharging of the battery cell.

The battery cell includes an electrode assembly and an electrolytic solution, and the electrode assembly is composed of a positive electrode sheet, a negative electrode sheet and a separator. Operations of the battery cell mainly rely on movements of metal ions between the positive electrode sheet and the negative electrode sheet. The positive electrode sheet includes a positive current collector and a positive active material layer. The positive active material layer is coated on a surface of the positive current collector, and the current collector that is not coated with the positive active material layer protrudes from the current collector coated with the positive active material layer and is used as a positive tab. In an example of a lithium-ion battery, the material of the positive current collector may be aluminum, and the positive active material may be lithium cobalt oxide, lithium iron phosphate, ternary lithium, lithium manganate, or the like. The negative sheet includes a negative current collector and a negative active material layer. The negative active material layer is coated on a surface of the negative current collector, and the current collector that is not coated with the negative active material layer protrudes from the current collector coated with the negative active material layer and is used as a negative tab. A material of the negative current collector may be copper, and a material of the negative active material may be carbon, silicon, or the like. In order to ensure that no fusing occurs when a large current passes through, there are a plurality of positive tabs which are stacked together, and there are a plurality of negative tabs which are stacked together. A material of the separator may be polypropylene (PP) or polyethylene (PE), and the like. In addition, the electrode assembly may be a winding structure or a laminated structure, and the embodiments of the present application are not limited thereto.

In order to meet different power demands, the battery may include a plurality of battery cells, where the plurality of battery cells may be series-connected, parallel-connected or series-parallel connected. The series-parallel connection refers to a combination of series connection and parallel connection. Optionally, a plurality of battery cells may be firstly series-connected, parallel-connected or series-parallel connected to form a battery module, and then a plurality of battery modules are series-connected, parallel-connected or series-parallel connected to form a battery. That is, the plurality of battery cells may directly form a battery, or may firstly form battery modules, and then the battery modules form a battery. The battery is further provided in a power consumption device to provide electrical energy for the power consumption device.

The development of the battery technology is necessary to take into account design factors in multiple aspects simultaneously, such as energy density, cycle life, discharge capacity, C-rate, safety, etc. Among them, when an internal space of the battery is certain, improving the utilization rate of the internal space of the battery is an effective measure to improve the energy density of the battery. However, while improving the utilization rate of the internal space of the battery, other parameters of the battery, such as thermal management of the battery, are also needed to be considered.

During the charging and discharging process of the battery, a large amount of heat will be generated, especially in the process of fast charging, the battery cell will generate a large amount of heat, which is continuously accumulated and superimposed, making the battery temperature rise sharply. When the heat of the battery cell cannot be released in time, it may lead to thermal runaway of the battery, causing safety accidents such as smoke, fire, explosion and other safety accidents. At the same time, long-term severe temperature unevenness will greatly reduce the service life of the battery. In addition, when the temperature is very low, the discharge efficiency of the battery is very low, and it is even difficult to start at a low temperature, which affects the normal use of the battery. Therefore, how to ensure the requirements of thermal management in the battery is crucial.

In view of this, embodiments of the present application provide a technical solution, a thermal management component is provided in the battery to be connected to a first wall with a largest surface area of each battery cell among the plurality of battery cells that are arranged in a column along a first direction, where in a second direction, a size H1 of the thermal management component and a size H2 of the first wall satisfy: $0.1 \leq H1/H2 \leq 2$, and the second direction is perpendicular to the first direction and parallel to the first wall. In this way, there is no need to provide a beam and other structures in the middle of a box body of the battery, which may largely improve the space utilization rate inside the battery, thereby improving the energy density of the battery. At the same time, the above thermal management component may further be used to manage the temperature of the battery cell. Therefore, a technical solution of an embodiment of the present application may improve the energy density of the battery while meeting the requirements of thermal management of the battery, thereby improving the performance of the battery.

The technical solutions described in the embodiments of the present application are all applicable to various apparatuses using batteries, such as mobile phones, portable apparatus, notebook computers, electromobiles, electronic toys, electric tools, electric vehicles, ships and spacecrafts. For example, the spacecrafts include airplanes, rockets, space shuttles and spaceships, and the like.

It should be understood that the technical solutions described in the embodiments of the present application are not only applicable to the apparatus described above, but to all apparatus using batteries. However, for brief description, the following embodiments are all described by an example of an electric vehicle.

For example, as shown in FIG. 1, FIG. 1 is a schematic structural diagram of a vehicle 1 according to an embodiment of the present application. The vehicle 1 may be a fuel-powered vehicle, a gas-powered vehicle or a new energy vehicle, and the new energy vehicle may be a battery electric vehicle, a hybrid vehicle, an extended-range vehicle, or the like. The vehicle 1 may be internally provided with a motor 40, a controller 30 and a battery 10, and the controller 30 is configured to control the battery 10 to supply power to the motor 40. For example, the battery 10 may be provided at the bottom or the head or the tail of the vehicle 1. The battery 10 may be configured to supply power to the vehicle 1. For example, the battery 10 may be used as an operation power supply of the vehicle 1 for a circuit system of the vehicle 1, for example, for a working power demand of the vehicle 1 during startup, navigation and operation. In another embodiment of the present application, the battery 10 may be used not only as an operating power source for the vehicle 1 but a driving power source for the vehicle 1, replacing or partially replacing the fuel or natural gas to provide driving power for the vehicle 1.

Figure 2:
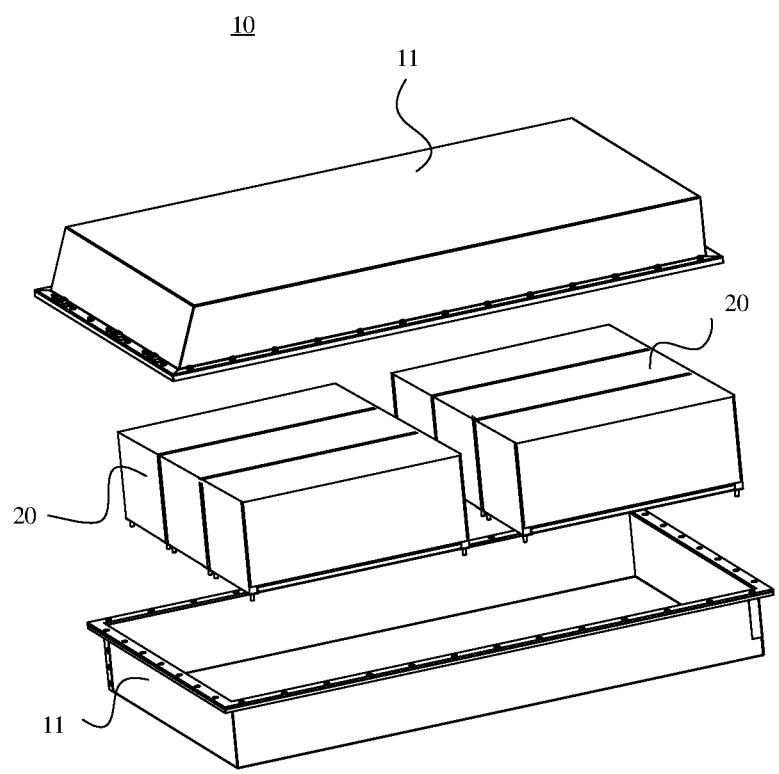
FIG. 2 is a schematic diagram of a battery according to an embodiment of the present application.

In order to satisfy different power demands, the battery 10 may include a plurality of battery cells. For example, as shown in FIG. 2, it is a schematic structural diagram of the battery 10 according to an embodiment of the present application. The battery 10 may include a plurality of battery cells 20. The battery 10 may further include a box body 11 with a hollow structure inside, and the plurality of battery cells are accommodated in the box body 11. For example, the plurality of battery cells are connected in series or in parallel or in a hybrid and are then placed in the box body 11.

Optionally, the battery 10 may also include other structures, which will not be described in detail herein. For example, the battery 10 may also include a busbar component. The busbar component is configured to implement electric connection among the plurality of battery cells 20, such as parallel connection, series connection or series-parallel connection. Specifically, the busbar component may implement an electrical connection between the battery cells 20 by connecting electrode terminals of the battery cells 20. Further, the busbar component may be fixed to the electrode terminals of the battery cells 20 by means of welding. Electric energy of the plurality of battery cells 20 may be further led out through an electrically conductive mechanism passing through the case. Optionally, electrically conductive mechanism may also belong to the busbar component.

According to different power requirements, the number of the battery cells may be set to any value. The plurality of battery cells 20 may be series-connected, parallel-connected or series-parallel connected to implement larger capacity or power. Since there may be many battery cells 20 included in each battery 10, the battery cells may be provided in groups for convenience of installation, and each group of battery cells 20 constitutes a battery module. The number of the battery cells 20 included in the battery module is not limited and may be set as required. The battery may include a plurality of battery modules, and these battery modules may be series-connected, parallel-connected or series-parallel connected.

Figure 3:
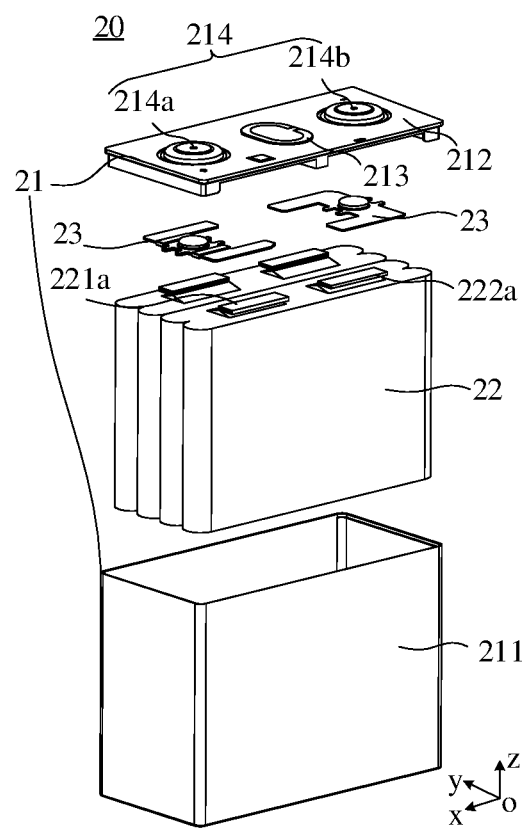
FIG. 3 is a schematic diagram of a battery cell according to an embodiment of the present application.

As shown in FIG. 3, FIG. 3 is a schematic structural diagram of the battery cell 20 according to an embodiment of the present application. The battery cell 20 includes one or more electrode assemblies 22, a housing 211 and a cover plate 212. The housing 211 and the cover plate 212 form a shell or a battery case 21. A wall of the housing 211 and the cover plate 212 are both referred to as a wall of the battery cell 20, where for a cuboid battery cell 20, the walls of the housing 211 includes a bottom wall and four side walls. The housing 211 is shaped according to a shape of one or more electrode assemblies 22 after combination. For example, the housing 211 may be a hollow cuboid, cube or cylinder, and one surface of the housing 211 has an opening such that one or more electrode assemblies 22 may be placed in the housing 211. For example, when the housing 211 is a hollow cuboid or cube, one plane of the housing 211 is an opening surface, i.e., the plane does not have a wall, so that the inside and outside of the housing 211 are in communication with each other. When the housing 211 is a hollow cylinder, an end face of the housing 211 is an opening surface, i.e., the end surface does not have a wall, so that the inside and outside of the housing 211 are in communication with each other. The cover plate 212 covers the opening and is connected to the housing 211 to form a closed cavity in which the electrode assembly 22 is placed. The housing 211 is filled with an electrolyte, such as an electrolytic solution.

The battery cell 20 may further include two electrode terminals 214, and the two electrode terminals 214 may be provided on the cover plate 212. The cover plate 212 is generally in the shape of a flat plate, and the two electrode terminals 214 are fixed on a flat plate surface of the cover plate 212. The two electrode terminals 214 are a positive electrode terminal 214a and a negative electrode terminal 214b, respectively. Each electrode terminal 214 is correspondingly provided with a connection member 23, or also referred to as a current collection member 23, which is located between the cover plate 212 and the electrode assembly 22 and configured to electrically connect the electrode assembly 22 to the electrode terminal 214.

As shown in FIG. 3, each electrode assembly 22 has a first tab 221a and a second tab 222a. The first tab 221a and the second tab 222a have opposite polarities. For example, when the first tab 221a is a positive tab, the second tab 222a is a negative tab. The first tab 221a of the one or more electrode assemblies 22 is connected to an electrode terminal through a connection member 23, and the second tab 222a of the one or more electrode assemblies 22 is connected to the other electrode terminal through the other connection member 23. For example, the positive electrode terminal 214a is connected to the positive tab via a connection member 23, and the negative electrode terminal 214b is connected to the negative tab via the other connection member 23.

In the battery cell 20, according to actual usage requirements, there may be a single or a plurality of electrode assemblies 22. As shown in FIG. 3, there are four independent electrode assemblies 22 in the battery cell 20.

A pressure relief mechanism 213 may also be provided on the battery cell 20. The pressure relief mechanism 213 is configured to be actuated when an internal pressure or temperature of the battery cell 20 reaches a threshold, to relieve the internal pressure or temperature.

The pressure relief mechanism 213 may be in various possible pressure relief structures, which is not limited in the embodiments of the present application. For example, the pressure relief mechanism 213 may be a temperature-sensitive pressure relief mechanism, the temperature-sensitive pressure relief mechanism is configured to be capable of being melted when the internal temperature of the battery cell 20 provided with the pressure relief mechanism 213 reaches a threshold; and/or the pressure relief mechanism 213 may be a pressure-sensitive pressure relief mechanism, and the pressure-sensitive pressure relief mechanism is configured to be capable of being fractured when an internal gas pressure of the battery cell 20 provided with the pressure relief mechanism 213 reaches a threshold.

Figure 4:
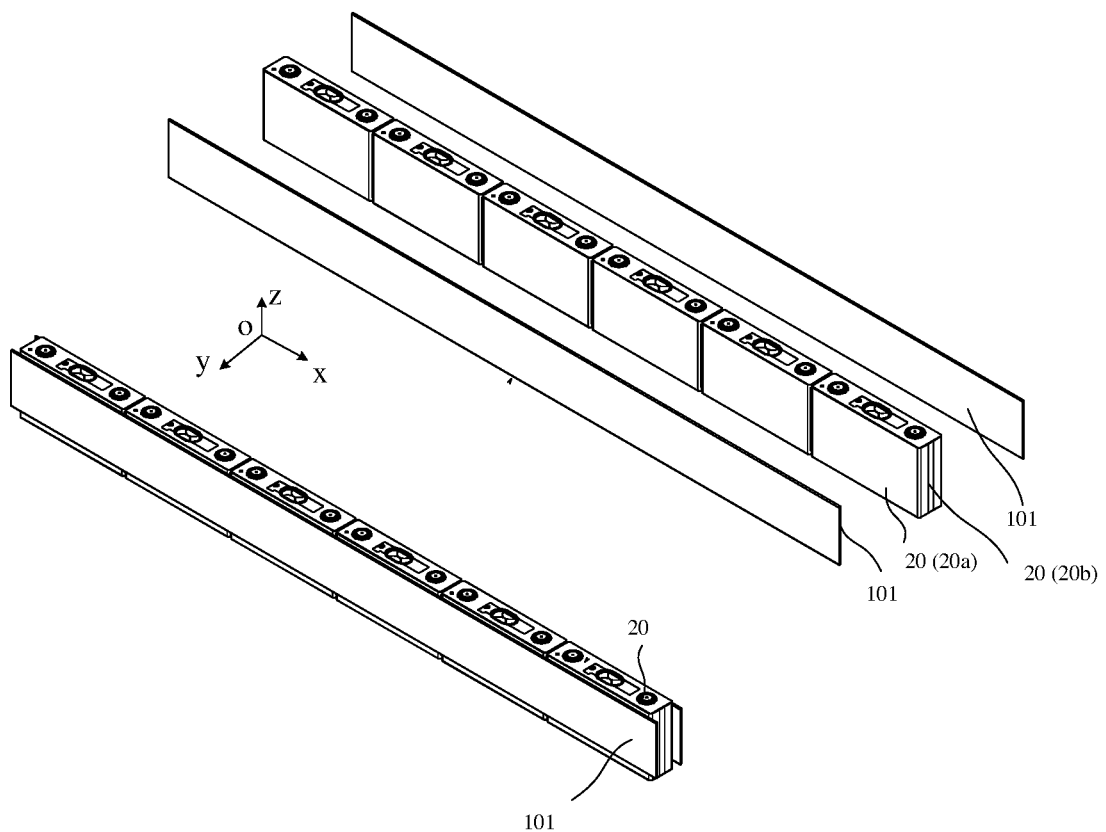
FIG. 4 is a schematic diagram of a battery according to an embodiment of the present application.

FIG. 4 is a schematic structural diagram of the battery in an embodiment of the present application. As shown in FIG. 4, the battery 10 includes a plurality of battery cells 20 arranged along a first direction and a thermal management component 101. The thermal management component 101 extends along the first direction and is connected to a first wall 20a of each battery cell 20 among the plurality of battery cells 20, the first wall 20a is a wall with a largest surface area of the battery cell 20, the thermal management component 101 is configured to adjust a temperature of the battery cell 20; and where in the second direction, a size H1 of the thermal management component 101 and a size H2 of the first wall 20a satisfy: $0.1 \leq H1/H2 \leq 2$, and the second direction is perpendicular to the first direction and parallel to the first wall 20a.

Both the thermal management component 101 and the plurality of battery cells 20 extend along the first direction, for example, extend in a direction x, and the thermal management section 101 is connected to the first wall 20a of each battery cell in a column of battery cells 20. The second direction is perpendicular to the first direction and parallel to the first wall 20a, where the second direction may be a direction z.

In the second direction, the size H1 of the thermal management component 101 may be a height of the thermal management component 101, and the size H2 of the first wall 20a may be a height of the first wall 20a. The relationship between H1 and H2 satisfies: $0.1 \leq H1/H2 \leq 2$.

When $H1/H2 \leq 0.1$, a heat exchange area between the battery cell 20 and the thermal management component 101 is smaller, so the battery cell 20 cannot be cooled or heated in time, which is difficult to meet the requirements of thermal management of the battery.

When $H1/H2 > 2$, although the requirements of thermal management in the battery can be met, the thermal management component 101 occupies a lot of space at this time, which wastes the space utilization in the second direction, so that it is difficult to ensure the requirements of the battery for energy density.

Optionally, the thermal management component 101 may be a water cooling plate, which is used to cool the battery cell 20 in the process of fast charging or to heat the battery cell 20 when the temperature is too low.

Optionally, the thermal management component 101 may be made of a material with good thermal conductivity, such as aluminum and other metallic materials.

In the embodiment of the present application, the thermal management component 101 is provided in the battery 10 to be connected to the first wall 20a with a largest surface area of each battery cell 20 among the plurality of battery cells 20 that are arranged in a column along the first direction; and where in the second direction, the size H1 of the thermal management component 101 and the size H2 of the first wall 20a satisfy: $0.1 \leq H1/H2 \leq 2$, and the second direction is perpendicular to the first direction and parallel to the first wall 20a. In this way, there is no need to provide a beam and other structures in the middle of a box body of the battery, which may largely improve the space utilization rate inside the battery 10, thereby improving the energy density of the battery 10. At the same time, the above thermal management component 101 may further be used to manage the temperature of the battery cell 20. Therefore, a technical solution of an embodiment of the present application may improve the energy density of the battery 10 while meeting the requirements of thermal management of the battery 10, thereby improving the performance of the battery 10.

Optionally, in an embodiment of the present application, the size H1 of the heat management component 101 and the size H2 of the first wall 20a further satisfy: $0.3 \leq H1/H2 \leq 1.3$. In this way, it can be ensured that the temperature of the battery cell does not exceed 55° C. in the process of fast charging.

Optionally, in an embodiment of the present application, the heat exchange area between the first wall 20a and the thermal management component 101 is S, and the relationship between a capacity Q of the battery cell 20 and the heat exchange area S satisfies: $0.03 \text{ Ah/cm}^2 \leq Q/S \leq 6.66 \text{ Ah/cm}^2$.

The heat exchange area S may be a contact area between the first wall 20a and the first thermal management component 101, and the heat exchange area S satisfies: $S=H1*W$, where W is a size of each battery cell 20 along the first direction.

When $Q/S \leq 0.03 \text{ Ah/cm}^2$, the heat exchange area S is large enough to meet the requirements of thermal management of the battery, but at this time, the space occupied by the thermal management component 101 is too large, which is difficult to meet the requirements of the battery 10 for energy density When $Q/S > 6.66 \text{ Ah/cm}^2$, the heat exchange area S is smaller, the heat of the battery cell 20 cannot be exported through the thermal management component 101 in time, and the battery cell 20 cannot be quickly cooled in time, which is difficult to meet the requirements of thermal management.

By adjusting the relationship between the heat exchange area S and the capacity Q of the battery cell 20, the temperature of the battery cell 20 may be maintained in an appropriate range during the charging of the battery, especially in the process of fast charging; and in addition, when the capacity Q of the battery cell is certain, the heat exchange area S may be adjusted to flexibly meet the requirements of thermal management of the battery.

In a possible implementation manner, the size H1 of the thermal management component is 1.5 cm~30 cm. In this way, it can be ensured that the temperature of the battery cell does not exceed 55° C. in the process of fast charging of the battery.

Figure 5:
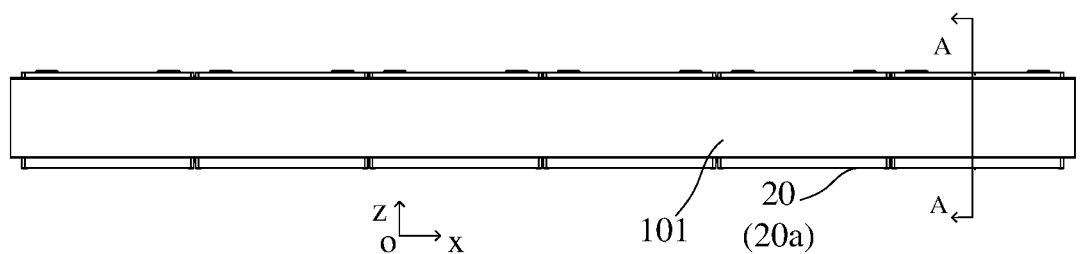
FIG. 5 is a schematic diagram of a battery cell connected to a thermal management component according to an embodiment of the present application.
Figure 6:
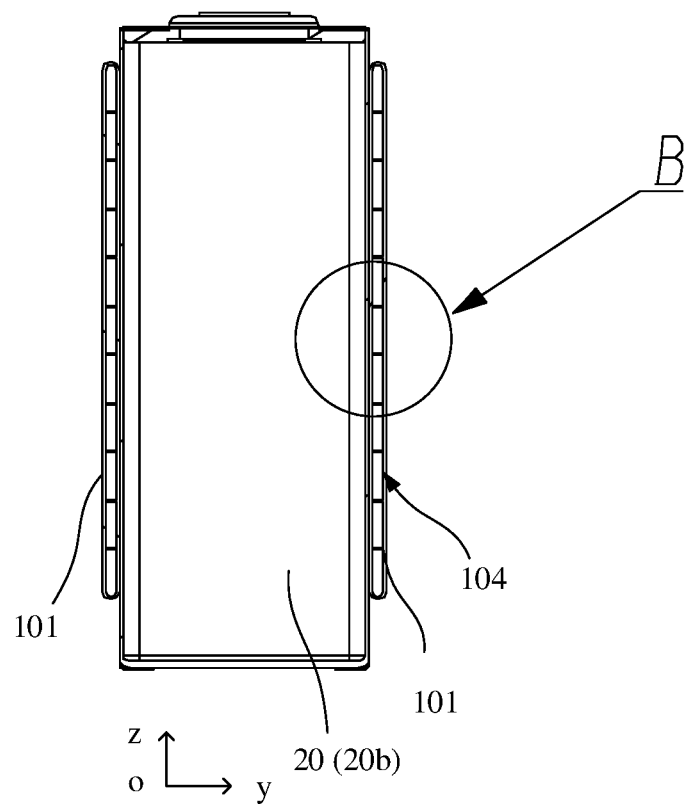
FIG. 6 is a cross-sectional view taken along a direction A-A in FIG. 5.
Figure 7:
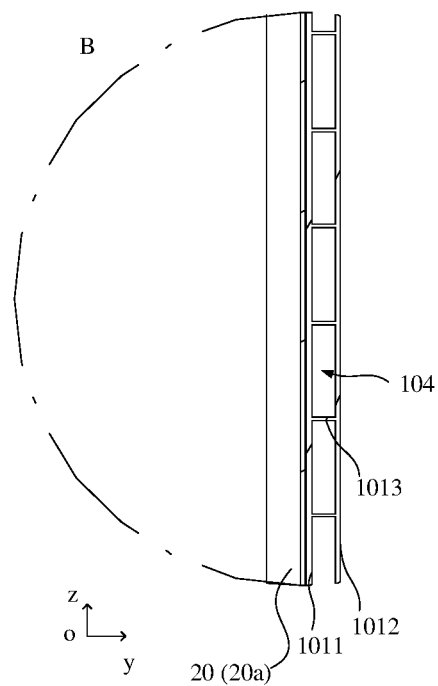
FIG. 7 is an enlarged schematic diagram of a region B in FIG. 6.

FIG. 5 is a schematic diagram of a battery cell connected to a thermal management component according to an embodiment of the application; FIG. 6 is a cross-sectional view taken along a direction A-A in FIG. 5; and FIG. 7 is an enlarged schematic diagram of a region B in FIG. 6. Optionally, in an embodiment of the present application, in combination with FIGS. 5 to 7, the thermal management component 101 includes a first thermally conductive plate 1011 and a second thermally conductive plate 1012 provided opposite to each other along a third direction; where a flow channel 104 is provided between the first thermally conductive plate 1011 and the second thermally conductive plate 1012, and the flow channel 104 is configured to accommodate a fluid for adjusting the temperature of the battery cell 20, and the third direction is perpendicular to the first direction and the second direction.

The first thermally conductive plate 1011 and the second thermally conductive plate 1012 are provided opposite to each other along the third direction and form a flow channel 104, where the third direction may be a y direction. The first thermally conductive plate 1011 and the second thermally conductive plate 1012 may be made of a material with good thermal conductivity, such as aluminum and other metallic materials.

In the third direction, a column of battery cells 20 arranged along the first direction may be connected to the thermal management component 101 only on one side, or both sides may be connected to the thermal management component 101, which is not limited in the embodiments of the present application.

Optionally, along the first direction, a length of the thermal management component 101 is equal to the sum of lengths of all the battery cells 20 in the same column, so that the battery cells 20 may be sufficiently cooled while reducing the space occupied by the thermal management component 101. In other embodiments, the length of the thermal management component 101 may be less than or equal to the sum of the lengths of all the battery cells 20, which may be specifically set according to actual needs. This is not limited in the embodiments of the present application.

Optionally, in an embodiment of the present application, the thermal management component 101 further includes a stiffener 1013, provided between the first thermally conductive plate 1011 and the second thermally conductive plate 1012; and the stiffener 1013, the first thermally conductive plate 1011 and the second thermally conductive plate 1012 form the flow channel 104. In this way, the structural strength of the thermal management component 101 is enhanced.

Optionally, the number of stiffeners 1013 is one, so that one or two flow channels 104 may be formed between the first thermally conductive plate 1011 and the second thermally conductive plate 1012. When the stiffener 1013 is only connected to the first thermally conductive plate 1011 or the second thermally conductive plate 1012, the stiffener 1013 is a cantilever with one end connected to the thermally conductive plate along the third direction, at this time, only one flow channel 104 is formed; and when the stiffener 1013 is connected to the first thermally conductive plate 1011 and the second thermally conductive plate 1012, two flow channels 104 are formed. The number of the stiffeners 1013 may be specifically set according to requirements, which is not limited in the embodiments of the present application.

Optionally, when the number of the flow channels 104 is multiple, different flow channels 104 may be independent of each other, and may also be communicated through an adapter.

Optionally, the stiffener 1013 extends along the first direction, that is, an angle between the stiffener and the first thermally conductive plate 1011 or the second thermally conductive plate 1012 is a right angle.

Optionally, in an embodiment of the present application, the angle between the stiffener 1013 and the first thermally conductive plate 1011 or the second thermally conductive plate 1012 is an acute angle. In this way, more expansion space may be provided for the battery cell 20.

Optionally, in an embodiment of the present application, the battery cell 20 includes two first walls 20a provided opposite to each other in the third direction and two second walls 20b provided opposite to each other in the first direction, where in the first direction, the second walls 20b of two adjacent battery cells 20 face each other. For example, the battery cell 20 includes a first wall 20a, a second wall 20b and third walls; the first wall 20a, the second wall 20b and the third walls are adjacent to each other, where a surface area of the first wall 20a is larger than that of the second wall 20b, one of the two third walls is provided away from a bottom of the box body as a top surface of the battery cell, and the other is provided toward the bottom of the box body as a bottom surface of the battery cell.

Figure 8:
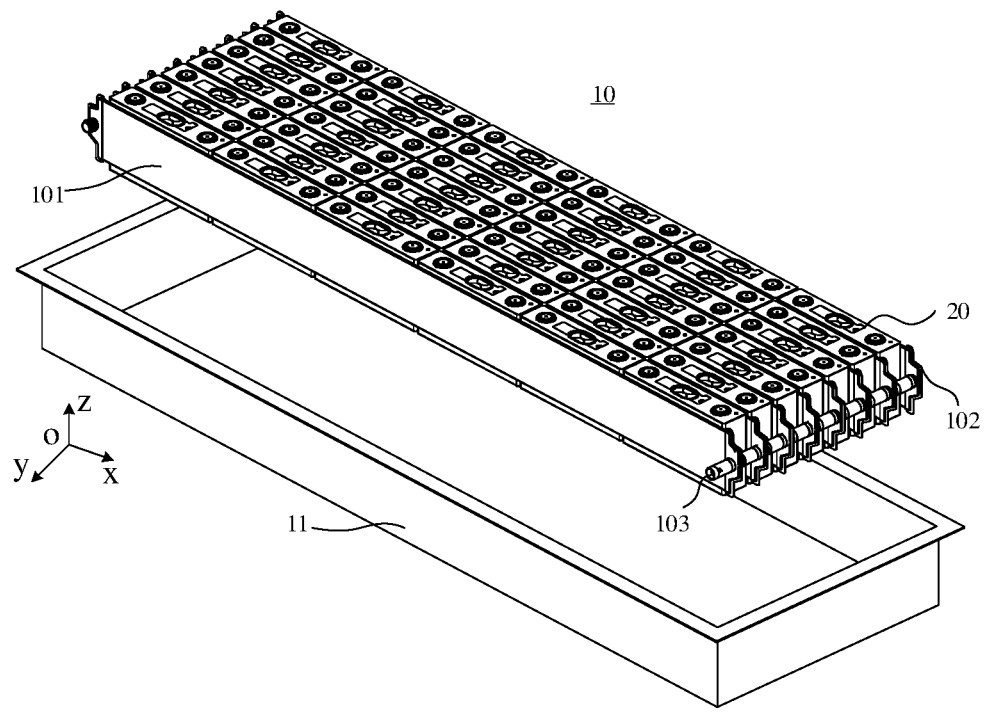
FIG. 8 is a schematic diagram of a battery according to an embodiment of the present application.

FIG. 8 is a schematic structural diagram of a battery according to an embodiment of the present application. Optionally, in an embodiment of the present application, as shown in FIG. 8, the battery 10 includes the plurality of battery cells arranged in a plurality of columns along the first direction and the plurality of the thermal management components 101, where the plurality of columns of the battery cells 20 and the plurality of the thermal management components 101 are alternately provided in the third direction, and the third direction is perpendicular to the first direction and the second direction. In this way, the plurality of columns of battery cells 20 and the plurality of thermal management components 101 are connected to each other to form a whole, and are accommodated in the box body, which may not only effectively perform the thermal management on each column of battery cells 20, but also ensure the overall structural strength of the battery, thereby improving the performance of the battery.

The battery 10 includes a box body 11, the plurality of columns of battery cells 20 and the plurality of thermal management components 101, a pipe 103 and a current collector 102. The current collector 102 and the pipe 103 are provided at both ends of the thermal management component 101 along the first direction, and the fluid is transported to the current collector 102 through the pipe 103, and then collected by the current collector 102 and transported to the thermal management component 101, so as to cool or heat the battery cell 20.

The plurality of columns of battery cells 20 and the plurality of thermal management components 101 are alternately provided in the third direction, where along the third direction, they may be arranged in the manner of battery cell-thermal management component-battery cell, or may be arranged in the manner of thermal management component-battery-cell-thermal management component. In the former arrangement manner, the number of columns of battery cells 20 is N, and the number of thermal management components 101 is N−1, and the energy density of the battery arranged in this manner is higher. In the latter arrangement manner, the number of columns of battery cells 20 is N, and the number of thermal management components 101 is N+1, thermal management performance of the battery 10 arranged in this manner is better, and it is faster to cool the battery cell 20. Both of the above two arrangement manners can cool the battery cell 20 in time on the premise of ensuring the energy density of the battery 10, and can effectively prevent thermal runaway due to too high a temperature of the battery cell 20.

Optionally, in the battery 10, it may also be arranged in the manner of thermal management component-battery cell-battery cell-thermal management component, as long as cooling or heating of the first wall 20a of the battery cell 20 may be achieved, which is not limited in the embodiments of the present application.

Optionally, in an embodiment of the present application, the thermal management component 101 and the first wall 20a are bonded. In this way, the connection strength between the thermal management component 101 and the first wall 20a is increased.

Optionally, the thermal management component 101 may also be sandwiched between the battery cells 20 in adjacent columns or between a side wall of the box body 11 and the battery cell 20 by abutting against the first wall 20a.

It should be understood that the relevant parts in each embodiment of the present application may be referred to each other, and for the sake of brevity, details are not described herein again.

An embodiment of the present application further provides a power consumption device, which may include the battery 10 in the above embodiments. Optionally, the power consumption device may be a vehicle 1, a ship or a spacecraft, etc., but this is not limited by the embodiment of the present application.

The battery 10 and the power consumption device of the embodiment of the present application are described above, and a method and a device for producing a battery of the embodiments of the present application will be described below. For the parts that are not described in detail, reference is made to the foregoing embodiments.

Figure 9:
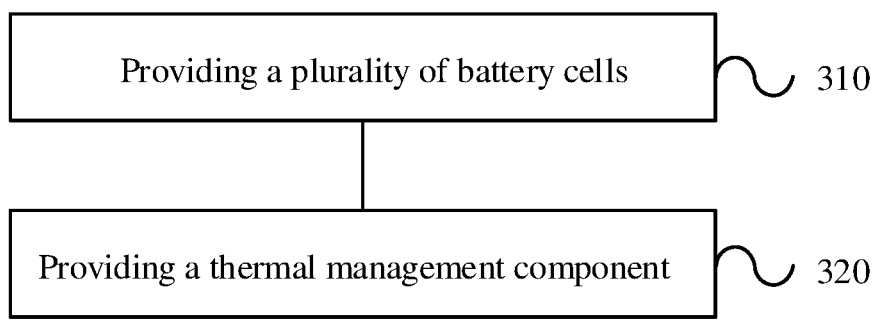
FIG. 9 is a schematic diagram of a method for producing a battery according to an embodiment of the present application.

FIG. 9 shows a schematic diagram of a method 300 for producing a battery according to an embodiment of the present application. As shown in FIG. 9, the method 300 may include:

310, providing a plurality of battery cells 20 arranged along a first direction;

320, providing a thermal management component 101 extending along the first direction and being connected to a first wall 20a of each battery cell 20 among the plurality of battery cells 20, the first wall 20a being a wall with a largest surface area of the battery cell 20, the thermal management component 101 being configured to adjust a temperature of the battery cell 20; and where in a second direction, a size H1 of the thermal management component 101 and a size H2 of the first wall 20a satisfy: 0.1≤H1/H2≤2, and the second direction is perpendicular to the first direction and parallel to the first wall 20a.

Figure 10:
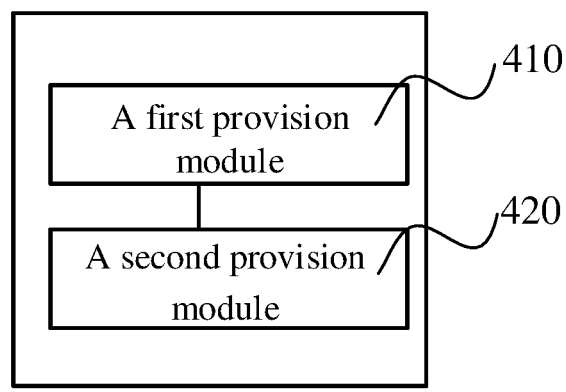
FIG. 10 is a schematic diagram of a device for producing a battery according to an embodiment of the present application.

FIG. 10 shows a schematic block diagram of a device 400 for producing a battery according to an embodiment of the present application. As shown in FIG. 10, the device 400 for producing the battery may include: a first provision module 410 and a second provision module 420.

The first provision module 410 is configured to provide a plurality of battery cells 20 arranged along a first direction.

The second provision module 420 is configured to provide a thermal management component 101 extending along the first direction and being connected to a first wall 20a of each battery cell 20 among the plurality of battery cells 20, the first wall 20a being a wall with a largest surface area of the battery cell 20, the thermal management component 101 being configured to adjust a temperature of the battery cell 20; and where in a second direction, a size H1 of the thermal management component 101 and a size H2 of the first wall 20a satisfy: 0.1≤H1/H2≤2, and the second direction is perpendicular to the first direction and parallel to the first wall 20a.

The embodiments of present application are explained in the following. The embodiments described below are exemplary and intended to be used to only explain the present application, and may not be understood as limiting the present application. Embodiments with no specific techniques or conditions specified are conducted according to techniques or conditions described in the literature in the art or according to the product specification.

The battery was charged and tested, and the test results are shown in Table 1.

TABLE 1

Temperature test of battery cells and thermal management components with different specifications in the process of charging

| Q (Ah) | D (mm) | W (cm) | H2 (cm) | H1 (cm) | H1/H2 | Q/(H1*W) (Ah/cm²) | Highest temperature T in the process of charging |
|---|---|---|---|---|---|---|---|
| 240 | 71.25 | 17.4 | 20 | 26 | 1.3 | 0.5305 | T ≤ 50° C. |
| 280 | 88 | 20.3 | 11.2 | 20 | 1.7857 | 0.6897 | T ≤ 50° C. |
| 280 | 88 | 20.3 | 11.2 | 10.2 | 0.9107 | 1.3523 | T ≤ 50° C. |
| 280 | 88 | 20.3 | 11.2 | 5 | 0.4464 | 2.7586 | 50° C. < T ≤ 55° C. |
| 280 | 88 | 20.3 | 11.2 | 1.0 | 0.0893 | 13.7931 | T > 55° C. |
| 203 | 85.8 | 14.8 | 10.3 | 20 | 1.9417 | 0.6858 | T ≤ 50° C. |
| 203 | 85.8 | 14.8 | 10.3 | 10.2 | 0.9903 | 1.3447 | T ≤ 50° C. |
| 203 | 85.8 | 14.8 | 10.3 | 7 | 0.6796 | 1.9595 | T ≤ 50° C. |
| 203 | 85.8 | 14.8 | 10.3 | 2.2 | 0.1942 | 6.2346 | 50° C. < T ≤ 55° C. |
| 156 | 44.3 | 22 | 10.2 | 15 | 1.4706 | 0.4727 | T ≤ 50° C. |
| 156 | 44.3 | 22 | 10.2 | 10.2 | 1.0000 | 0.6952 | T ≤ 50° C. |
| 156 | 44.3 | 22 | 10.2 | 5 | 0.4902 | 1.4182 | T ≤ 50° C. |
| 102 | 52 | 14.8 | 9.5 | 20 | 2.1053 | 0.0345 | T ≤ 50° C. |
| 102 | 52 | 14.8 | 9.5 | 10.2 | 1.0737 | 0.0676 | T ≤ 50° C. |
| 5 | 12.5 | 12 | 6.5 | 12 | 1.8462 | 0.0347 | T ≤ 50° C. |
| 5 | 12.5 | 12 | 6.5 | 5 | 0.7692 | 0.0833 | T ≤ 50° C. |

Although the present application is already described with reference to the preferred embodiments, various improvements may be made to the present application and the components therein may be replaced with equivalents without departing from the scope of the present application. In particular, as long as there is no structural conflict, various technical features mentioned in the various embodiments may be combined in any manner. The present application is not limited to the specific embodiments disclosed herein, and includes all technical solutions falling within the scope of the claims.

What is claimed is:

1. A battery, comprising:
   a plurality of battery cells arranged along a first direction;
   a thermal management component extending along the first direction and being connected to a first wall of each battery cell among the plurality of battery cells, the first wall being a wall with a largest surface area of the battery cell, the thermal management component being configured to adjust a temperature of the battery cell; and
   wherein in a second direction, a size H1 of the thermal management component and a size H2 of the first wall satisfy: 0.1≤H1/H2≤2, and the second direction is perpendicular to the first direction and parallel to the first wall;
   wherein the thermal management component comprises a first thermally conductive plate and a second thermally conductive plate provided opposite to each other along a third direction; and
   wherein, a flow channel is provided between the first thermally conductive plate and the second thermally conductive plate, and the flow channel is configured to accommodate a fluid for adjusting a temperature of the battery cell, and the third direction is perpendicular to the first direction and the second direction.

2. The battery according to claim 1, wherein the size H1 of the thermal management component and the size H2 of the first wall further satisfy: $0.3 \leq H1/H2 \leq 1.3$.

3. The battery according to claim 1, wherein a heat exchange area between the first wall and the thermal management component is S, and a relationship between a capacity Q of the battery cell and the heat exchange area S satisfies: $0.03 Ah/cm^2 \leq Q/S \leq 6.66 Ah/cm^2$.

4. The battery according to claim 1, wherein the size H1 of the thermal management component is 1.5 cm~30 cm.

5. The battery according to claim 1, wherein the thermal management component further comprises a stiffener, the stiffener is provided between the first thermally conductive plate and the second thermally conductive plate, and the stiffener, the first thermally conductive plate and the second thermally conductive plate form the flow channel.

6. The battery according to claim 5, wherein an angle between the stiffener and the first thermally conductive plate or the second thermally conductive plate is an acute angle.

7. The battery according to claim 1, wherein the battery cell comprises two first walls provided opposite to each other in a third direction and two second walls provided opposite to each other in the first direction, wherein in the first direction, the second walls of two adjacent battery cells face each other, and the third direction is perpendicular to the first direction and the second direction.

8. The battery according to claim 1, wherein the battery comprises the plurality of the battery cells arranged in a plurality of columns along the first direction and a plurality of the thermal management components, wherein the plurality of columns of the battery cells and the plurality of the thermal management components are alternately provided in a third direction, and the third direction is perpendicular to the first direction and the second direction.

9. The battery according to claim 1, wherein the thermal management component and the first wall are bonded.

10. A power consumption device, comprising: the battery according to claim 1, the battery being configured to provide electric energy.

11. A method for producing a battery, comprising:
providing a plurality of battery cells arranged along a first direction;
providing a thermal management component extending along the first direction and being connected to a first wall of each battery cell among the plurality of battery cells, the first wall being a wall with a largest surface area of the battery cell, the thermal management component being configured to adjust a temperature of the battery cell; and
wherein in a second direction, a size H1 of the thermal management component and a size H2 of the first wall satisfy: $0.1 \leq H1/H2 \leq 2$, and the second direction is perpendicular to the first direction and parallel to the first wall;
wherein the thermal management component comprises a first thermally conductive plate and a second thermally conductive plate provided opposite to each other along a third direction; and
wherein, a flow channel is provided between the first thermally conductive plate and the second thermally conductive plate, and the flow channel is configured to accommodate a fluid for adjusting a temperature of the battery cell, and the third direction is perpendicular to the first direction and the second direction.

12. A device for producing a battery, comprising:
a first provision module for providing a plurality of battery cells arranged along a first direction;
a second provision module for providing a thermal management component extending along the first direction and being connected to a first wall of each battery cell among the plurality of battery cells, the first wall being a wall with a largest surface area of the battery cell, the thermal management component being configured to adjust a temperature of the battery cell; and
wherein in a second direction, a size H1 of the thermal management component and a size H2 of the first wall satisfy: $0.1 \leq H1/H2 \leq 2$, and the second direction is perpendicular to the first direction and parallel to the first wall;
wherein the thermal management component comprises a first thermally conductive plate and a second thermally conductive plate provided opposite to each other along a third direction; and
wherein, a flow channel is provided between the first thermally conductive plate and the second thermally conductive plate, and the flow channel is configured to accommodate a fluid for adjusting a temperature of the battery cell, and the third direction is perpendicular to the first direction and the second direction.

* * * * *